A. C. MENGES.
SELF GRINDING AND EQUALIZING VALVE FOR EXPLOSIVE ENGINES.
APPLICATION FILED JUNE 9, 1917.

1,258,353.

Patented Mar. 5, 1918.
2 SHEETS—SHEET 1.

WITNESSES:

INVENTOR
Albert C. Menges

BY
ATTORNEY

A. C. MENGES.
SELF GRINDING AND EQUALIZING VALVE FOR EXPLOSIVE ENGINES.
APPLICATION FILED JUNE 9, 1917.

1,258,353.

Patented Mar. 5, 1918.
2 SHEETS—SHEET 2.

WITNESSES:
W. T. Mattox
A. S. Payne

INVENTOR
Albert C. Menges
BY
J. H. Weatherford
ATTORNEY

UNITED STATES PATENT OFFICE.

ALBERT C. MENGES, OF MEMPHIS, TENNESSEE.

SELF-GRINDING AND EQUALIZING VALVE FOR EXPLOSIVE-ENGINES.

1,258,353.   Specification of Letters Patent.   Patented Mar. 5, 1918.

Application filed June 9, 1917.   Serial No. 173,735.

*To all whom it may concern:*

Be it known that I, ALBERT C. MENGES, a citizen of the United States, residing at Memphis, in the county of Shelby and State of Tennessee, have invented certain new and useful Improvements in Self-Grinding and Equalizing Valves for Explosive - Engines, of which the following is a full, clear, and exact description, such as will enable any one skilled in the art to make and use same.

My invention relates more especially to improvements in puppet valves, whereby they are rotated slightly each time they open and thereby self-grind themselves sufficiently to keep them clean and seating tight.

The objects of my invention are to provide means whereby the valves will be rotated slightly each time they are opened, thereby keeping the valves clean and ground to a perfect seat, and changing the points of wear on the valve stems and guides, causing them to remain centered, preventing sticking of the valves or stems, and minimizing the wear on same. A further object is to make the valves seat tighter and to do away with the excessive valve grinding now periodically necessary, thus giving a more even mixture of gas in the engine and causing same to run more steadily.

I accomplish these objects as will be more fully hereinafter set out in the drawings, specifications and claims.

In the drawings:—

Figure 1:
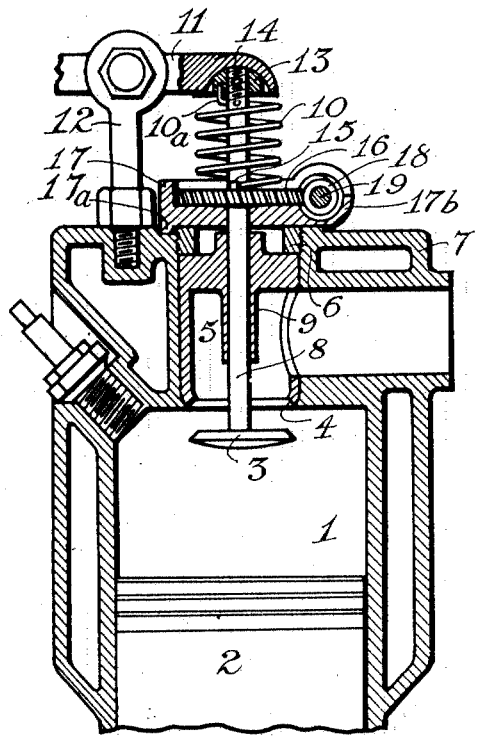
Figure 1 is a section through the cylinder and one of the valves of what is known as a "valve in the head" engine, taken at right angles to the center line of the engine, and showing the valve open.

Referring now to the drawings in which the parts are indicated by the same numerals in all the views, 1 is the cylinder, 2 the piston, 3 the ordinary type of puppet valve, 4 the valve seat which in the particular type of engine shown is at the lower end of a removable cage 5, which cage is held in place by an exteriorly threaded retaining collar 6, which collar screws into the head 7 of the cylinder 1. 8 is the valve stem which extends upward through a guide 9, which guide is an integral part of the cage 5. 10 is the valve spring concentric with the valve stem, 11 the rocker arm operating the valve and 12 a post forming the fulcrum for the rocker arm 11.

The spring 10 comes at the upper end against a nut or collar 13 fastened securely yet removably to the valve stem 8 and the said spring is in turn firmly attached to the collar, preferably by turning up the end $10^a$ into a corresponding hole in the said collar. The collar 13 is preferably screwed on a threaded portion of the valve stem 8 as shown and if so screwed on is preferably held against rotation on the said stem by a pin or cotter key 14 inserted through a hole in both. At the opposite or bottom end the spring 10 rests against a stop 15 on a worm gear 16, which worm gear is essentially a flat disk centered on the valve stem $10^c$ and having worm gear teeth cut on its periphery, this gear in turn rests in a housing 17, which housing rests on the cylinder head 7, and is prevented from rotating by a lug or pin $17^a$ extending into a corresponding groove in the said cylinder head. This housing 17 has an extension $17^b$ at right angles to the center line of the engine, which extension is adapted to carry a worm 18 mounted on a worm shaft 19 parallel to the center line of the engine, extending as shown in Fig. 2 the length of the engine, and carrying on the front end a pulley 20 which is driven by a belt 21 passing over the said pulley 20 and a corresponding pulley 22 on the fan shaft 23. 24 is a bearing fastened to the engine and supporting the shaft 19 at the pulley 20.

Figure 2:
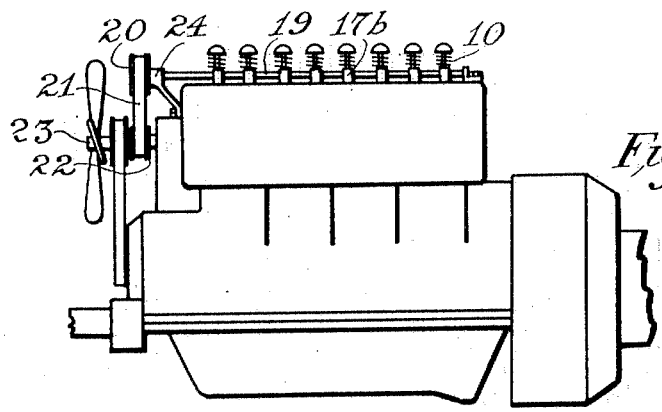
Fig. 2 is a side elevation of a four cylinder engine of the same type on a reduced scale.

The operation of the device is as follows:

Referring first to Fig. 2, the engine having been started, the shaft 19 is rotated by the belt 21 acting through the pulley 20, thus rotating, in the case of the four cylinder engine shown, the eight worms corresponding to the eight valves shown. Referring now to Fig. 1 the action on an individual valve is as follows:—The worm shaft 19 rotates the worm 18 and through it the worm gear 17. The lug 15 engages the lower end of the spring 10 and rotates same around the valve stem 8. During that period of the cycle of action in which the valve 3 is open, it is rotated by the action above referred to, the spring 10 rotating the collar 13 and through it the valve stem 8 to which the said collar is fastened. During that period of the cycle, however, in which the valve is closed the spring 10 is put in torsion by the rotation of the worm gear 17, which torsion acts to suddenly rotate the valve as it leaves the valve seat, giving a light grinding action and presenting new surfaces for wear both in the valve and seat and in the valve stem and bearings.

Figure 3:
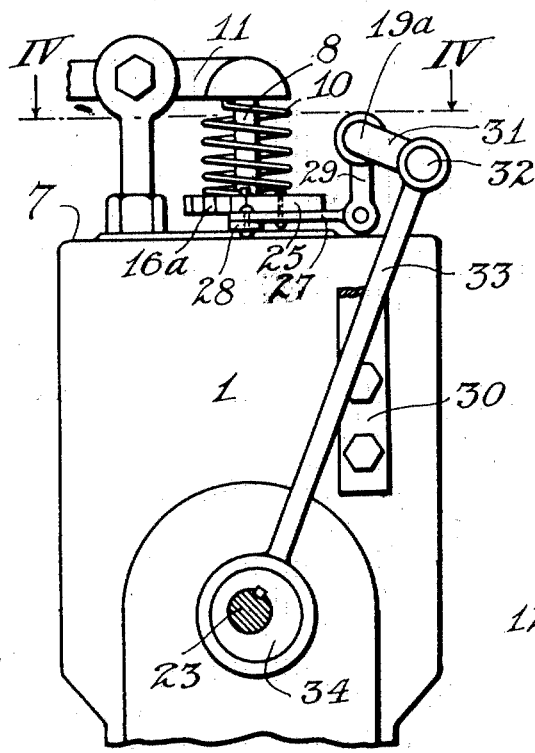
Fig. 3 is an end elevation taken on the line III—III of Fig. 4 looking in the direction of the arrow showing a modified form.
Figure 4:
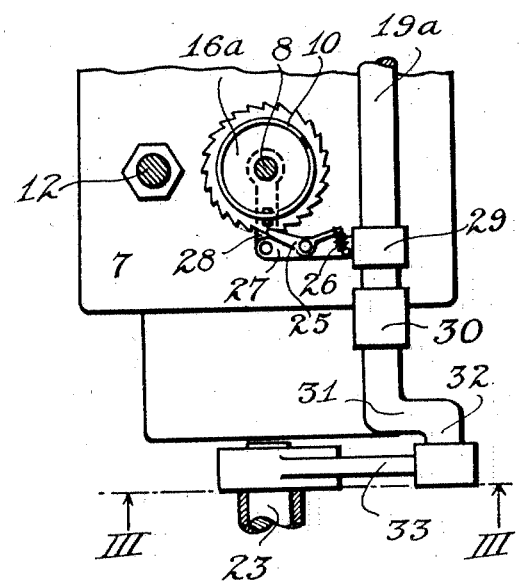
Fig. 4 is a plan view taken on the line IV—IV of Fig. 3 looking down.

In Figs. 3 and 4 I have shown a modified form of the rotating mechanism in which ratchet teeth are cut on the periphery of the disk 16ª instead of the worm gear teeth before shown. This disk is rotated by a ratchet pawl 25 which engages the ratchet teeth on the disk, being held in engagement by the spring 26. The pawl 25 is pivoted on a ratchet bar 27 which in turn is pivoted to a swinging arm 28 having the valve stem 8 as a center. The arm 27 is reciprocated by a crank arm 29 keyed or otherwise firmly fastened on a shaft 19ª corresponding to the worm shaft 19 and like it extending the full length of the engine. 30 is a bearing, (cut away in Fig. 3 to show the other mechanism), fastened to the engine and carrying the said shaft which is bent to form a crank arm 31 and crank pin 32. 33 is a connecting rod connecting this crank arm 32 with an eccentric 34 (or if desired crank arm and pin) on the fan shaft 23.

The operation is as follows: The fan shaft rotating, the eccentric 34 reciprocates the rod 33 oscillating the crank arm 31 and shaft 19ª and through it the arm 29 (and similar arms not shown on the other cylinders) which reciprocates the ratchet bar 27, causing the pawl 25 to engage successive teeth on the ratchet and put the spring 10 under torsion as described under the worm gear type.

It will, of course, be readily seen that while I have described this device solely as attached to a valve in the head motor, it can easily be adapted to other forms of puppet valve motors. It will also be seen that the worm shaft 19 may be driven directly from the engine shaft and may be driven by chain drive or even by gearing if desired and that the method of attaching the spring to the valve stem and to the worm wheel may also be varied.

Having now fully described my invention, what I claim and desire to secure by Letters Patent in the United States is:—

1. In a self-grinding puppet valve, the combination with the cylinder head, the valve seat formed in said head, the valve, the valve stem, a spring concentric with said stem and firmly attached at one end thereto for closing said valve against said seat, and means of opening said valve against the pressure of said spring, of a disk concentric with said valve stem interposed between said spring and said cylinder head, a lug on said disk engaging said spring and means of rotating said disk, so that said spring will be put in torsion when said valve is closed and will rotate said valve as same opens, substantially as and for the purposes set forth.

2. In a self-grinding puppet valve, the combination with the cylinder head, the valve seat formed in said head, the valve, the valve stem, a spring concentric with said stem and attached at one end thereto for closing said valve against said seat, and means of opening said valve against the pressure of said spring, of a disk concentric with said valve stem interposed between said spring and said cylinder head and engaging said spring, worm gear teeth cut on the periphery of said disk, a worm engaging said teeth, and means of rotating said worm so that said spring will be put in torsion when said valve is closed and will rotate said valve as same opens, substantially as and for the purposes set forth.

3. In a puppet valve engine having a plurality of cylinders, the combination with a cylinder head for each of said cylinders, valve seats formed in said heads, valves adapted to close against said seats, valve stems for said valves, a spring concentric with each of said stems and attached at one end thereto for closing said valve against its said seat, and means of opening said valves against the pressure of said springs, of a disk concentric with each of said valve stems interposed between said spring and its corresponding cylinder head, a lug on each of said disks engaging the corresponding spring, worm teeth on the periphery of each of said disks, an individual worm engaging each of said disks, a shaft carrying said worms and means of rotating said shaft and thereby rotating said disks, so that each of said springs shall be put in torsion when its corresponding valve is closed and will rotate said valve as same opens, substantially as and for the purposes described.

4. In a self-grinding puppet valve, the combination with the cylinder head, the valve seat formed in said head, the valve, the valve stem, a spring concentric with said stem and attached at one end thereto for closing said valve against said seat, and means of opening said valve against the pressure of said spring, of a disk concentric with said valve stem interposed between said spring and said cylinder head and engaging said spring, worm gear teeth cut on the periphery of said disk, a worm engaging said teeth, a housing surrounding said disk and worm to hold same in mesh, and means of rotating said worm so that said spring will be put in torsion when said valve is closed and will rotate said valve as same opens, substantially as and for the purposes set forth.

5. In a puppet valve engine having a plurality of cylinders, the combination with a cylinder head for each of said cylinders, valve seats formed in said heads, valves adapted to close against said seats, valve stems for said valves, a spring concentric with each of said valve stems and attached at one end thereto for closing said valve against its said seat, and means of opening said valves against the pressure of said springs, of a disk concentric with each of said valve stems interposed between said spring and its corresponding cylinder head, a lug on each of said disks, an individual worm engaging each of said disks, a housing surrounding each of said disks and its corresponding worm to hold same in mesh, a shaft carrying said worms and supported by bearings in said housing and means of rotating said shaft, and thereby rotating said disks, so that each of said springs shall be put in torsion when its corresponding valve is closed and will rotate said valve as same opens, substantially as and for the purposes described.

6. In a self-grinding puppet valve, the combination with the cylinder head, the valve seat formed in said head, the valve, the valve stem, a spring concentric with said stem and firmly attached at one end thereto for closing said valve against the pressure of said spring, of a disk concentric with said valve stem, interposed between said spring and said cylinder head, and engaging said spring, and means of rotating said disk so that said spring will be put in torsion when said valve is closed and will rotate said valve as same opens, substantially as and for the purposes set forth.

In testimony whereof I have hereunto set my name.

ALBERT C. MENGES.

Witnesses:
   D. C. MILLER,
   A. H. PAYNE.